United States Patent
Shanahan et al.

(10) Patent No.: US 6,961,827 B2
(45) Date of Patent: Nov. 1, 2005

(54) VICTIM INVALIDATION

(75) Inventors: Patricia Shanahan, San Diego, CA (US); Andrew E. Phelps, Encinitas, CA (US); Nicholas E. Aneshansley, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 696 days.

(21) Appl. No.: 10/011,115

(22) Filed: Nov. 13, 2001

(65) Prior Publication Data

US 2003/0093722 A1 May 15, 2003

(51) Int. Cl.⁷ .............................................. G06F 12/00
(52) U.S. Cl. ...................... 711/144; 711/133; 711/134; 711/135; 711/145
(58) Field of Search ........................ 711/118, 130–135, 711/144, 145, 3

(56) References Cited

U.S. PATENT DOCUMENTS

| 6,122,714 A | * | 9/2000 | VanDoren et al. .......... 711/150 |
| 6,243,742 B1 | | 6/2001 | Hagersten et al. .......... 709/213 |
| 6,249,520 B1 | * | 6/2001 | Steely et al. ................ 370/368 |
| 6,721,853 B2 | | 4/2004 | Guthrie et al. .............. 711/135 |
| 6,725,337 B1 | | 4/2004 | Tan et al. .................... 711/133 |
| 6,754,782 B2 | | 6/2004 | Arimilli et al. ............. 711/144 |
| 6,772,316 B2 | * | 8/2004 | Lyon .......................... 711/207 |

* cited by examiner

Primary Examiner—T Nguyen
(74) Attorney, Agent, or Firm—Meyertons Hood Kivlin Kowert & Goetzel, P.C.; B. Noël Kivlin

(57) ABSTRACT

The present invention provides a method and apparatus for invalidating a victimized entry. The apparatus comprises a directory cache adapted to store one or more cache entries, and a control unit. The control unit is adapted to determine whether it is desirable to remove a shared cache entry from the directory cache, and invalidate the shared cache entry in response to determining that it is desirable to remove the shared cache entry from the directory cache.

20 Claims, 8 Drawing Sheets

VICTIM INVALIDATION

BACKGROUND OF THE INVENTION

1. Field of the Invention

This invention relates generally to processor-based systems, and, more particularly, to invalidating a victimized entry in a directory cache in a distributed, shared-memory processor-based system.

2. Description of the Related Art

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, be configured as one or more domains, where a domain, for example, may act as a separate machine by running its own instance of an operating system to perform one or more of the configured tasks.

A mid-range server, in one embodiment, may employ a distributed shared memory system, where processors from one system board can access memory contents from another system board. The union of all of the memories on the system boards of the mid-range server comprises a distributed shared memory (DSM).

One method of accessing data from other system boards within a system is to broadcast a memory request on a common bus. For example, if a requesting system board desires to access information stored in a memory line residing in a memory of another system board, the requesting system board typically broadcasts on the common bus its memory access request. All of the system boards in the system may receive the same request and the system board whose memory address ranges match the memory address provided in the memory access request may then respond.

The broadcast approach for accessing contents of memories in other system boards may work adequately when a relatively small number of system boards are present in a system. However, such an approach may be unsuitable as the number of system boards grows. As the number of system boards grows, so does the number of memory access requests, thus to handle this increased traffic, larger and faster buses may be needed to allow the memory accesses to complete in a timely manner. Operating a large bus at high speeds may be problematic because of electrical concerns, in part, due to high capacitance, inductance, and the like. Furthermore, a larger number of boards within a system may require extra broadcasts, which could further add undesirable delays and may require additional processing power to handle the extra broadcasts.

Designers have proposed the use of directories in a distributed shared memory system to reduce the need for globally broadcasting memory requests. Typically, each system board serves as a home board for memory lines within a selected memory address range, and where each system board is aware of the memory address ranges belonging to the other system boards within the system. Each home board generally maintains its own directory for memory lines that fall within its address range. Thus, when a requesting board desires to access memory contents from another board, instead of generally broadcasting the memory request in the system, the request is transmitted to the appropriate home board. The home board may consult its directory and determine which system board is capable of responding to the memory request and identify any system boards that need to be informed of the request.

Directories are generally effective in reducing the need for globally broadcasting memory requests during memory accesses. However, implementing a directory that is capable of mapping every memory location within a system board generally represents a significant memory overhead. As such, directory caches are often designed to hold only mappings for a subset of the total memory. The system typically must use some other method, such as broadcasting, to resolve requests for memory that are not currently mapped in the directory cache.

In a hybrid system, summary information may be stored for every line, but full information is only stored for a subset covered by a directory cache. The computational expense of resolving a memory request without a directory cache entry may depend on the state reflected by the summary information. A line that is known to be invalid everywhere other than the home board may be less expensive to access than one that is known to be shared without the actual sharers being known. From time to time it may be necessary to remove an entry from the directory cache to make room for a new entry. This is known as "victimizing" the line. At the time of victimization the full directory cache entry may still be available, but once victimization is complete all entries except the summary directory information will typically be lost and future memory requests for summary information become computationally expensive.

SUMMARY OF THE INVENTION

In one aspect of the instant invention, an apparatus is provided for invalidating a victimized entry. The apparatus comprises a directory cache adapted to store one or more cache entries, and a control unit. The control unit is adapted to determine whether it is desirable to remove a shared cache entry from the directory cache, and invalidate the shared cache entry in response to determining that it is desirable to remove the shared cache entry from the directory cache.

In another aspect of the present invention, a method is provided for invalidating a victimized entry. The method comprises identifying an entry to remove from a directory cache, determining whether it is desirable to transmit an invalidation message to one or more caches in a system based on the identified entry, and changing the status of a cacheable line in response to determining that it is desirable to transmit the invalidation message.

In yet another aspect of the instant invention, an article comprising one or more machine-readable storage media containing instructions is provided for invalidating a victimized entry. The instructions, when executed, may enable a processor to identify an entry to remove from a directory cache, determine if the identified entry is a shared entry, and change the status of a cacheable line in response to determining that the identified entry is a shared entry.

BRIEF DESCRIPTION OF THE DRAWINGS

The invention may be understood by reference to the following description taken in conjunction with the accompanying drawings, in which like reference numerals identify like elements, and in which.

Figure 1:
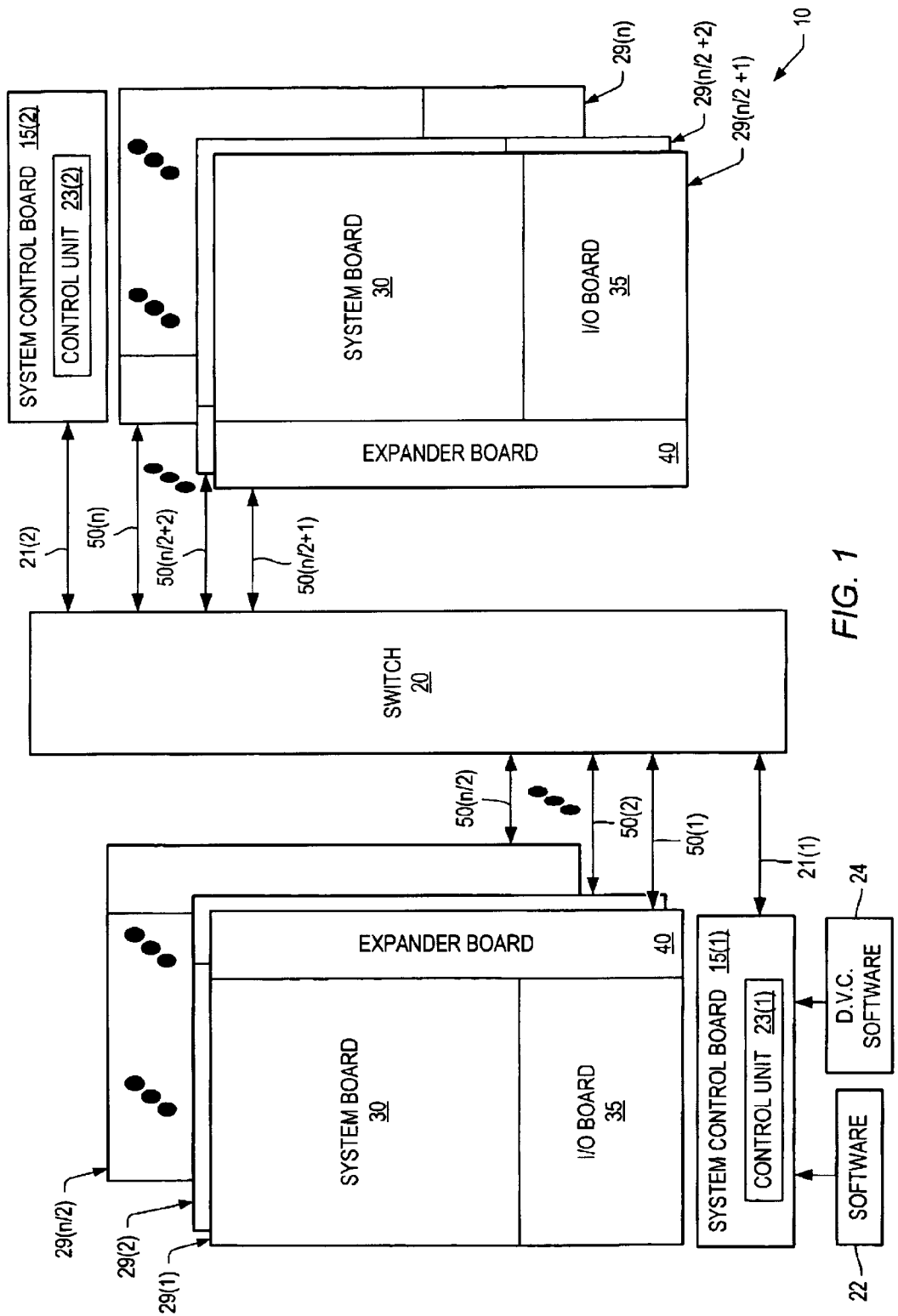
FIG. 1 shows a stylized block diagram of a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As will be described in more detail below, in accordance with one or more embodiments of the present invention, a victimized entry in a directory cache is invalidated in some instances to reduce the likelihood of broadcasting invalidation messages within a processor-based system. The term "victimized," as utilized herein, may include an entry or entries that have been removed or selected for removal (but not necessarily yet removed) from the directory cache. As a result, victim invalidation may improve the overall performance of the processor-based system.

Referring now to FIG. 1, a block diagram of a system 10 in accordance with one embodiment of the present invention is illustrated. The system 10, in one embodiment, includes a plurality of system control boards 15(1–2) that are coupled to a switch 20. For illustrative purposes, lines 21(1–2) are utilized to show that the system control boards 15(1–2) are coupled to the switch 20, although it should be appreciated that, in other embodiments, the boards 15(1–2) may be coupled to the switch in any of a variety of ways, including by edge connectors, cables, or other available interfaces.

In the illustrated embodiment, the system 10 includes two control boards 15(1–2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate hot-swap replaceable system control board. In one embodiment, during any given moment, generally one of the two system control boards 15(1–2) actively controls the overall operations of the system 10.

If failures of the hardware or software occur on the main system control board 15(1), or failures on any hardware control path from the main system control board 15(1) to other system devices occur, the system controller failover software 22 automatically triggers a failover to the alternative control board 15(2). The alternative system control board 15(2), in one embodiment, assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1–2). The system control boards 15(1–2) in the illustrated embodiment may each include a respective control unit 23(1–2).

The system 10, in one embodiment, includes a plurality of system board sets 29(1–n) that are coupled to the switch 20, as indicated by lines 50(1–n). The system board sets 29(1–n) may be coupled to the switch 20 in one of several ways, including edge connectors or other available interfaces. The switch 20 may serve as a communications conduit for the plurality of system board sets 29(1–n), half of which may be connected on one side of the switch 20 and the other half on the opposite side of the switch 20.

The switch 20, in one embodiment, may allow system board sets 29(1–n) to communicate, if desired. Thus, the switch 20 may allow the two system control boards 15(1–n) to communicate with each other or with other system board sets 29(1–n), as well as allow the system board sets 29(1–n) to communicate with each other.

The system board sets 29(1–n), in one embodiment, comprise one or more boards, including a system board 30, I/O board 35, and expander board 40. The system board 30 may include processors and associated memories for executing, in one embodiment, applications, including portions of an operating system. The I/O board 35 may manage I/O cards, such as peripheral component interface cards and optical cards that are installed in the system 10. The expander board 40, in one embodiment, generally acts as a multiplexer (e.g., 2:1 multiplexer) to allow both the system board 30 and I/O board 35 to interface with the switch 20, which, in some instances, may have only one slot for interfacing with both boards 30, 35.

In one embodiment, the system 10 may be dynamically subdivided into a plurality of system domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system) and may be reconfigured without interrupting the operation of other domains.

Figure 2:
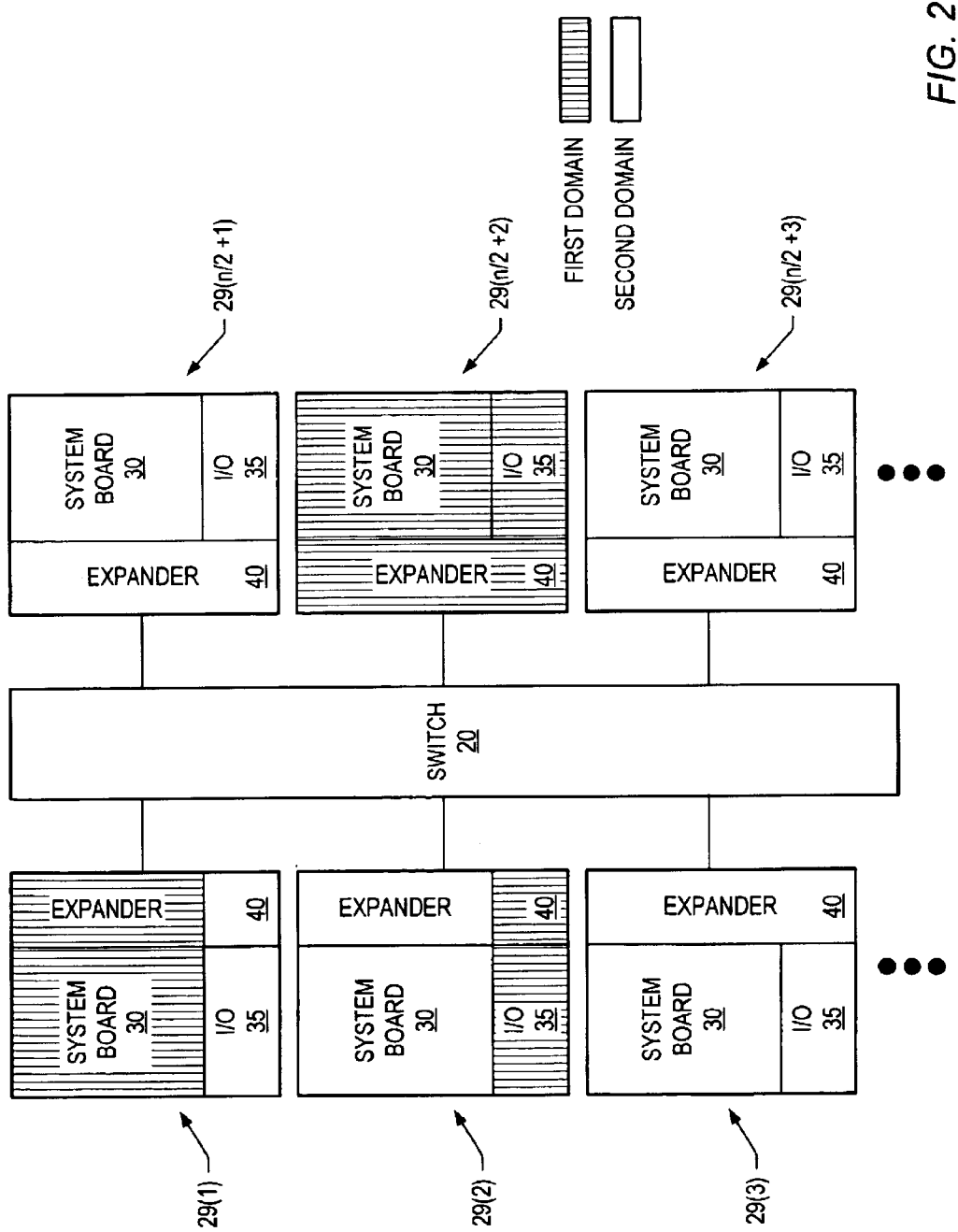
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1–n), one or more boards (e.g., system board 30, I/O board 35) from selected system board sets 29(1–n), or a combination thereof. Although not necessary, it may be possible to define each system board set 29(1–n) as a separate domain. For example, if each system board set 29(1–n) were its own domain, the system 10 may conceivably have up to "n" (i.e., the number of system board sets) different domains. When two boards (e.g., system board 30, I/O board 35) from the same system board set 29(1–n) are in different domains, such a configuration is referred to as a "split expander." The expander board 40 of the system board sets 29(1–n), in one embodiment, keeps the transactions separate for each domain. No physical proximity may be needed for boards in a domain.

Using the switch 20, inter-domain communications may be possible. For example, the switch 20 may provide a high-speed communications path so that data may be exchanged between the first domain and the second domain of FIG. 2. In one embodiment, a separate path for data and address through the switch 20 may be used for inter-domain communications.

Figure 3:
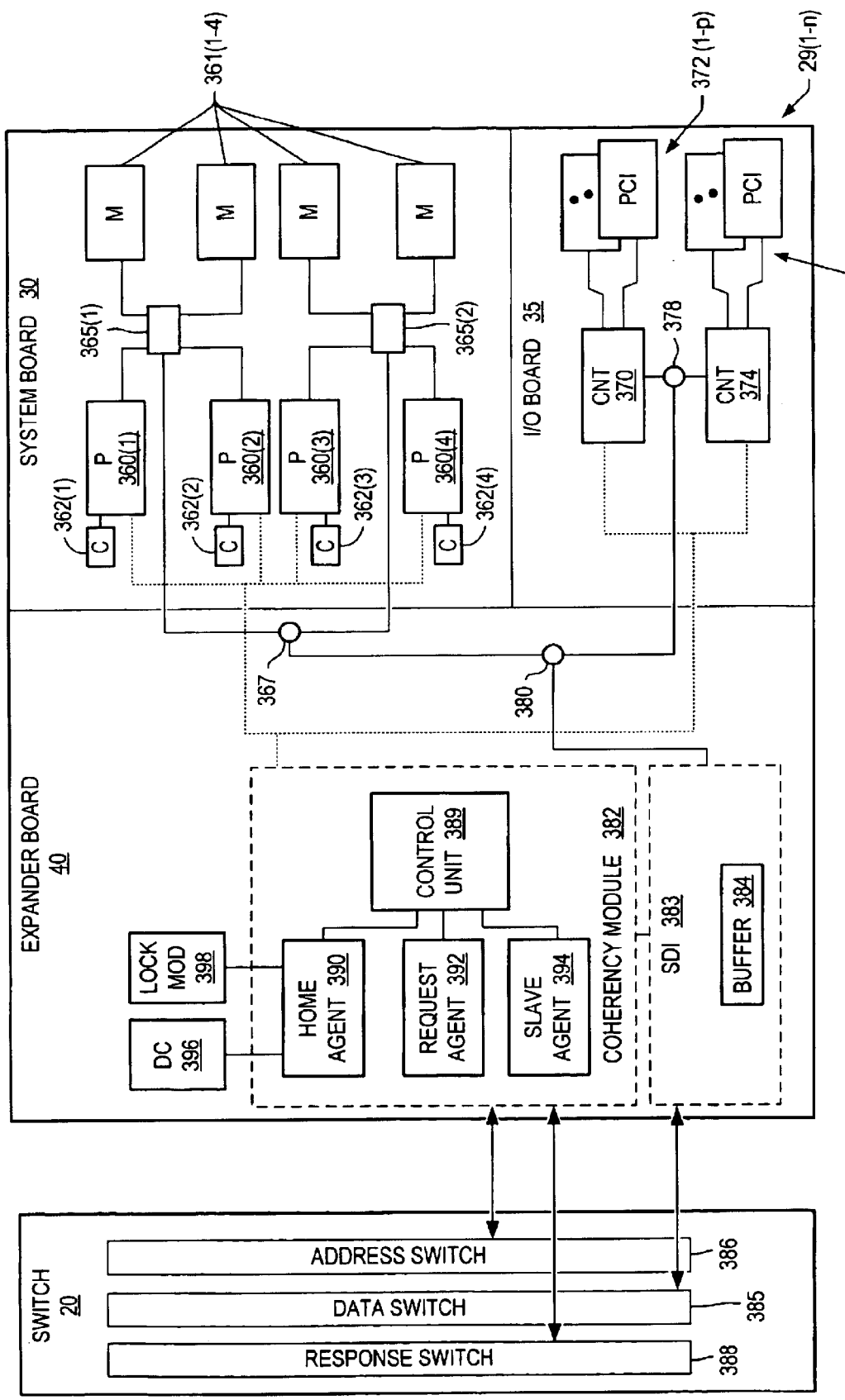
FIG. 3 depicts a stylized block diagram of one system board set that may be employed in the system of FIG. 1, in accordance with one embodiment of the present invention.

Referring now to FIG. 3, a block diagram of the system board set 29(1–n) coupled to the switch 20 is illustrated, in accordance with one embodiment of the present invention. The system board 30 of each system board set 29(1–n) in the illustrated embodiment includes four processors 360(1–4), with each of the processors 360(1–4) having an associated memory 361(1–4). In one embodiment, each of the processors 360(1–4) may be coupled to a respective cache memory 362(1–4). In other embodiments, each of the processors 360(1–4) may have more than one associated cache memories, wherein some or all of the one or more cache memories may reside within the processors 360(1–4). In one embodiment, each cache memory 362(1–4) may be a split cache, where a storage portion of the cache memory 362(1–4) may be external to the processor, and a control portion (e.g., tags and flags) may be resident inside the processors 360(1–4).

The processors 360(1–4), in one embodiment, may be able to access their own respective memories 361(1–4) and cache memories 362(1–4), as well as access the memories associated with other processors. In one embodiment, a different number of processors and memories may be employed in any desirable combination, depending on the implementation. In one embodiment, two five-port dual data switches 365(1–2) connect the processor/memory pairs (e.g., processors 360(1–2)/memories 361(1–2) and processors 360(3–4)/memories 361(3–4)) to a board data switch 367.

Although not so limited, the I/O board 35 of each system board set 29(1–n) in the illustrated embodiment includes a controller 370 for managing one or more of the PCI cards that may be installed in one or more PCI slots 372(1–p). In the illustrated embodiment, the I/O board 35 also includes a second controller 374 for managing one or more I/O cards that may be installed in one or more I/O slots 376(1–o). The I/O slots 376(1–o) may receive optics cards, network cards, and the like. The I/O board 35, in one embodiment, may communicate with the system control board 15(1–2) (see FIG. 1) over an internal network (not shown).

The two controllers 370, 374 of the I/O board 35, in one embodiment, are coupled to a data switch 378. A switch 380 in the expander board 40 receives the output signal from the data switch 378 of the I/O board 35 and from the switch 367 of the system board set 29(1–n) and provides it to a System Data Interface (SDI) 383, in one embodiment. The SDI 383 may process data transactions to and from the switch 20 and the system board 30 and I/O board 35. A separate address path (shown in dashed lines) is shown from the processors 360(1–4) and the controllers 370, 374 to the coherency module 382. In the illustrated embodiment, the SDI 383 includes a buffer 384, described in more detail below. The coherency module 382 may process address and response transactions to and from the switch 20 and the system and I/O boards 30 and 35.

In one embodiment, the switch 20 may include a data switch 385, address switch 386, and response switch 388 for transmitting respective data, address, and control signals provided by the coherency module 382 or SDI 383 of each expander board 40 of the system board sets 29(1–n). Thus, in one embodiment, the switch 20 may include three 18×18 crossbar switches that provide a separate data path, address path, and control signal path to allow intra- and inter-domain communications. Using separate paths for data, addresses, and control signals, may reduce the interference among data traffic, address traffic, and control signal traffic. In one embodiment, the switch 20 may provide a bandwidth of about 43 Gigabytes per second. In other embodiments, a higher or lower bandwidth may be achieved using the switch 20.

It should be noted that the arrangement and/or location of various components (e.g., coherency module 382, processors 360(1–4), controllers 370, 374) within each system board set 29(1–4) is a matter of design choice, and thus may vary from one implementation to another. Additionally, more or fewer components may be employed without deviating from the scope of the present invention.

In accordance with one embodiment of the present invention, cache coherency is performed at two different levels, one at the intra-system board set 29(1–n) level and one at the inter-system board set 29(1–n) level. With respect to the first level, cache coherency within each system board set 29(1–n) is performed, in one embodiment, using conventional cache coherency snooping techniques, such as the modified, owned, exclusive, shared, and invalid (MOESI) cache coherency protocol. Memory lines transition into the O state from M if another processor 360(1–4) requests a shared copy. A line in the O state cannot be modified, and is written back to memory when victimized. It represents a shared line for which the data in memory is out of date. The processors 360(1–4) may broadcast transactions to other devices within the system board set 29(1–n), where the appropriate device(s) may then respond with the desired results or data.

Because the number of devices within the system board set 29(1–n) may be relatively small, a conventional coherency snooping technique, in which requests are commonly broadcasted to other devices, may adequately achieve the desired objective. However, because the system 10 may contain a large number of system board sets 29(1–n), each having one or more processors 360(1–4), memory accesses may require a large number of broadcasts before such requests can be serviced. Accordingly, a second level of coherency may be performed at the system level (between the expander boards 40) by the coherency module 382 of each expander board 40 using, in one embodiment, the scalable shared memory (SSM) protocol.

The coherency module 382, in one embodiment, includes a control unit 389 coupled to a home agent 390, a request agent 392, and a slave agent 394. Collectively, the agents 390, 392, 394 may operate to aid in maintaining system-wide coherency. In the illustrated embodiment, the control unit 389 of the coherency module 382 interconnects the system board 30 and the I/O board 40 as well as interconnects the home agent 390, request agent 392, and slave agent 394 within the coherency module 382. In one embodiment, if the expander board 40 is split between two domains (i.e., the system and the I/O boards 30 and 35 of one system board set 29(1–n) are in different domains), the control unit 389 of the coherency module 382 may arbitrate the system board 30 and I/O board 35 separately, one on odd cycles, and the other on even cycles.

The SSM protocol uses MTags embedded in the data to control what the devices under the control of each expander board 40 can do to a cache line. The MTags may be stored in the caches 362(1–4) and/or memories 361(1–4) of each system board set 29(1–n). Table 1 below illustrates three types of values that may be associated with MTags.

TABLE 1

| MTag Type | Description |
| --- | --- |
| Invalid (gI) | No read or write allowed for this type of line. A device must ask for a new value before completing an operation with this line. |
| Shared (gS) | A read may complete, but not a write. |
| Modifiable (gM) | Both reads and writes are permitted to this line. |

As mentioned, the Mtag states are employed in the illustrated embodiment in addition to the conventional MOESI cache coherency protocol. For example, to do a write, a device should have a copy of the line that is both M and gM. If the line is gM but not M, then the status of the line may be promoted to M with a transaction within the expander board 40. If the line is not gM, then a remote transaction may have to be done involving the cache coherency module 382, which, as mentioned, employs the SSM protocol in one embodiment.

The coherency module 382, in one embodiment, controls a directory cache (DC) 396 that holds information about lines of memory that have been recently referenced using the SSM protocol. The DC 396, in one embodiment, may be stored in a volatile memory, such as a static random access memory (SRAM). The DC 396 may be a partial directory in that it may not have enough entry slots to hold all of the cacheable lines that are associated with a given expander board 40. As is described in more detail later, the coherency module 382, in one embodiment, controls a locking module 398 that prevents access to a selected entry in the directory cache 396 when the status of that entry, for example, is being updated.

Figure 4:
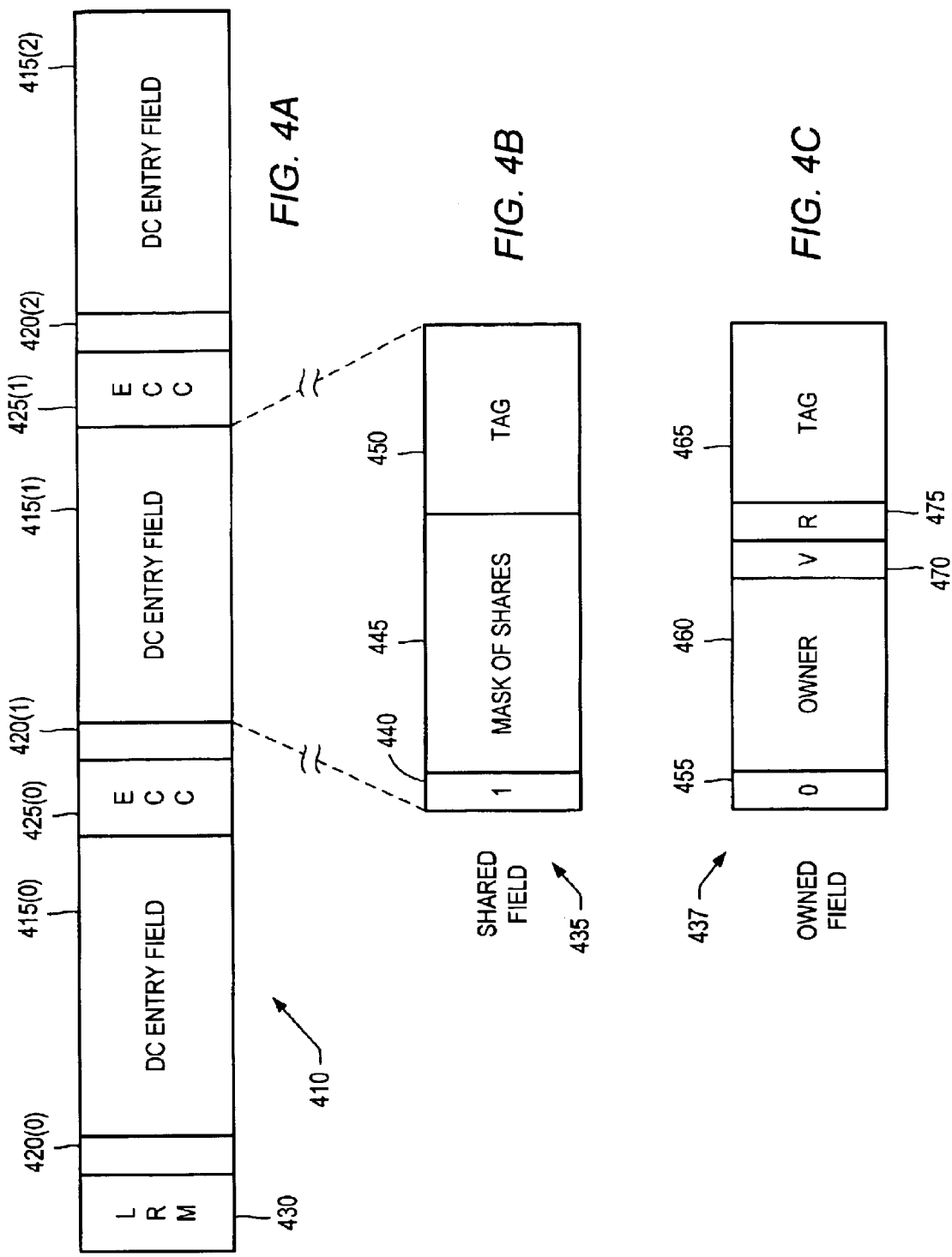
FIGS. 4A–C illustrate an exemplary directory cache entry that may be employed in the system of FIG. 1, in accordance with one embodiment of the present invention.

The DC 396 may be capable of caching a predefined number of directory entries corresponding to cache lines of the caches 362(1–4) for a given system board 30. The DC 396 may be chosen to be of a suitable size so that a reasonable number of commonly used memory blocks may generally be cached. Although not so limited, in the illustrated embodiment, the DC 396 is a 3-way set-associative cache, formed of three SRAMs that can be read in parallel. An exemplary 3-wide DC entry is shown in FIG. 4A. The DC 396, in one embodiment, includes 3-wide DC entries (collectively referred to as a "set") 410. Each DC entry in a given set 410 may be indexed by a partial address.

As shown in FIG. 4A, in one embodiment, each of the three DC entry fields 415(0–2) has an associated address parity field 420(0–2). Each set 410 includes an error correction code (ECC) field 425(0–1). In case of errors, the ECC field 425(0–1) may allow error correction, in some instances. Each 3-wide DC entry in a given set 410 includes a least recently modified (LRM) field 430 that may identify which of the three DC entry fields 415(0–2) was least recently modified. Although other encoding techniques may be employed, in the illustrated embodiment, three bits are used to identify the LRM entry. An exemplary list of LRM codes employed in the illustrated embodiment is provided in Table 2 below.

TABLE 2

DC Least-Recently-Modified encoding

| LRM | Most Recent | Middle | Least Recent |
| --- | --- | --- | --- |
| 000 | Entry 0 | Entry 1 | Entry 2 |
| 001 | Entry 1 | Entry 0 | Entry 2 |
| 010 | Entry 2 | Entry 0 | Entry 1 |
| 011 | *undefined state* | | |
| 100 | Entry 0 | Entry 2 | Entry 1 |
| 101 | Entry 1 | Entry 2 | Entry 0 |
| 110 | Entry 2 | Entry 1 | Entry 0 |
| 111 | *undefined state* | | |

As indicated in the exemplary LRM encoding scheme of Table 2, various combinations of bits in the LRM field 430 identify the order in which the three entry fields 415(0–2) in the DC 396 were modified. As an example, the digits '000' (i.e., the first entry in Table 2), indicate that the entry field 415(2) was least recently modified, followed by the middle entry field 415(1), and then the first entry field 415(0), which was most recently modified. As an added example, the digits '101' indicate that the entry field 415(0) was least recently modified, followed by the entry field 415(2), and then the entry field 415(1), which was most recently modified. As described later, the LRM field 430, in one embodiment, is utilized, in part, to determine which DC entry field 415(0–2) to victimize from a particular set 410 of the DC 396 when that set 410 is full.

In accordance with one embodiment of the present invention, two different types of entries, a shared entry 435 and an owned entry 437, may be stored in the entry fields 415(0–2) of the DC 396, as shown in FIGS. 4b–C. An owned entry 437, in one embodiment, signifies expander board 40 has both read and write access for that particular entry. A shared entry 435, in one embodiment, indicates that one or more expander boards 40 have read, but not write, access for that particular entry.

The shared entry 435, in one embodiment, includes an identifier field 440, a mask field 445, and an address tag field 450. The identifier field 440, in the illustrated embodiment, is a single bit field, which, if equal to bit 1, indicates that the stored cache line is shared by one or more of the processors 360(1–4) of the system board sets 29(1–n) in the system 10.

The mask field 445, which may have up to "n" bits (i.e., one bit for each of the system board sets 29(1–n)), identifies through a series of bits which of the system boards 30 of the system board sets 29(1–n), has a shared copy of the cache line. The address tag field 450 may store at least a portion of the address field of the corresponding cache line, in one embodiment.

The owned entry 437 includes an identifier field 455, an owner field 460, an address tag field 465, a valid field 470, and a retention bit field 475, in one embodiment. The identifier field 455, in the illustrated embodiment, is a single bit field, which, if equal to bit 0, indicates that the stored cache line is owned by the named expander in the system 10. The owner field 460 is adapted to store the identity of a particular expander board 40 of the system board sets 29(1–n) that holds the valid copy of the cache line. The address tag field 465 may be adapted to store at least an identifying portion of the address field of the corresponding cache line, in one embodiment. For example, the tag field 465 may be comprised of the upper order bits of the address. The valid field 470, in one embodiment, indicates if the corresponding entry in the DC 396 is valid. An entry in the DC 396 may be invalid at start-up, for example, when the system 10 or domain in the system 10 is first initialized. If the invalid bit is "0," an actual ownership of a line by a named expander is recorded in the owner field 460.

Figure 5:
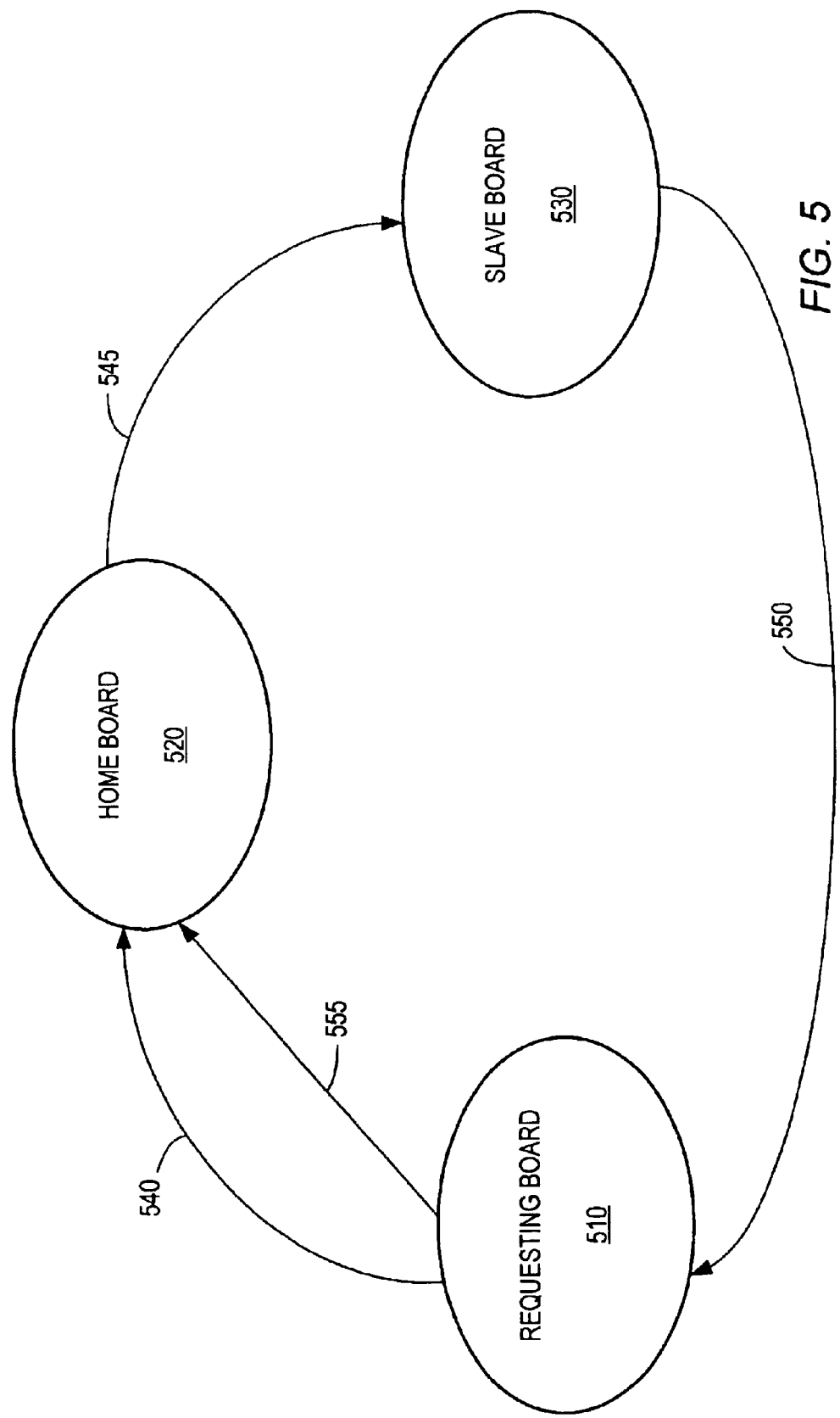
FIG. 5 illustrates a state diagram including the various communication paths between one or more boards of the system of FIG. 1, in accordance with one embodiment of the present invention.

Referring now to FIG. 5, a state diagram including the various communication paths between a requesting board 510, a home board 520, and slave board 530 in servicing memory access requests is illustrated, in accordance with one or more embodiments of the present invention. The boards 510, 520, 530, in one embodiment, may include one or more boards (e.g., expander board 40, system board 30, I/O board 35) of one or more control board sets 29(1–n). The term "memory access requests," as utilized herein, may include, in one embodiment, one or more of the processors 360(1–4) (see FIG. 3) of a given system board set 29(1–n) accessing one or more caches 362(1–4) or memories 361 (1–4) in the system 10.

Although not so limited, for the purposes of this discussion, it is herein assumed that one domain is configured in the system 10 that is formed of one or more complete (i.e., no split expanders) system board sets 29(1–n). Generally, a given cache line in the system 10 is associated with one home board 520. The requesting board 510 in the illustrated embodiment represents a board attempting to access a selected cache line. The slave board 530 in the illustrated embodiment represents a board that currently has a copy of a cache line that the requesting board 510 is attempting to access. In a case where a current copy of a requested cache line resides in the home board 520, then the home board 520 is also the slave board 530 for that transaction.

The requesting board 510 may initiate one of a variety of memory access transactions, including request-to-own (RTO), request-to-share (RTS), WriteStream, WriteBack, and ReadStream transactions. The one or more of the aforementioned memory access transactions may be local or remote transactions, where local transactions may include transactions that are broadcast locally within the system board set 29(1–n) and remote transactions may include transactions that are intended to access cache lines from other system board sets 29(1–n). Although not so limited, in one embodiment, an RTO may be issued to obtain an exclusive copy of a cache line, a RTS to obtain a shared copy of a cache line, a WriteBack transaction to write the cached line back to the home board, a ReadStream request to get a snapshot copy of the cache line, and a WriteStream request to write a copy of the cache line.

For illustrative purposes, an exemplary RTO transaction among the boards 510, 520, and 530 is described below. For the purpose of this illustration, it is herein assumed that the requesting board 510 is attempting to obtain write-access to a cache line owned by the home board 520, where the latest copy of the requested cache line resides on the slave board 530. The RTO from the requesting board 510 is forwarded to the home board 520 via path 540. The forwarding of the RTO from the requesting board 510 to the home board 520 is typically handled by the coherency module 382 (see FIG. 3) of the requesting board 510 utilizing the address provided with the RTO.

The requesting board 510 determines which of the home boards 520 has the requested cache line by, for example, mapping the address of the cache line to the address ranges of the caches associated with the various expander boards 40 within the system 10. When the home board 520 receives the RTO message over the path 540, the coherency module 382 of the home board 520 checks its directory cache 396 (see FIG. 3) to determine if there is an entry corresponding to the requested cache line. Assuming that an entry exists in the directory cache 396, the home board 520 may reference the information stored in that entry to determine if the slave board 530 currently has an exclusive copy of the requested cache line. It should be noted, in one embodiment, that while the directory cache 396 of the home board 520 is being referenced, the coherency module 382 may use the locking module 398 to at least temporarily prevent other expander boards 40 from accessing that entry in the directory cache 396.

Based on the information stored in the directory cache 396, the home board 520 is able to ascertain, in one embodiment, that the slave board 530 currently has an exclusive copy of the cache line. Accordingly, the home board 520, in one embodiment, transmits a request over a path 545 to the slave board 530 to forward a copy of the requested cache line to the requesting board 510. In one embodiment, the slave board 530 downgrades its copy from an exclusive copy (i.e., M-type) to an invalid copy (i.e., I-type) since, by definition, if one board in the system 10 has an exclusive M-copy (i.e., the requesting board 510 in this case), all other nodes should have invalid I-copies.

When the requesting board 510 receives a copy of the cache line over a path 550, it internally notes that it now has an exclusive M-copy and acknowledges over a path 555. When the home board 520 receives the acknowledgment message from the requesting board 510 over the path 555, the home board 520 updates its directory cache 396 to reflect that the requesting board 510 now has write-access to the cache line, and may use the locking module 398 to allow other transactions involving the cache line to be serviced. The paths 540, 545, 550, and 555, in one embodiment, may be paths through the switch 20 (see FIGS. 1 and 3).

As other transactions occur for accessing cache lines in the home board 520, for example, the coherency module 382 of the home board 520 routinely may update its directory cache 396 to reflect the status of the referenced cache lines. The status of the referenced cache lines may include information regarding the state of the cache line (e.g., M, I, S), ownership rights, and the like. At any given time, because of the finite size of the directory cache 396, it may be possible that a particular set 410 within the directory cache 396 may be full. When a particular set 410 within the directory cache 396 is full, it may be desirable to discard or overwrite old entries to store new entries. Because it may be desirable to retain some entries in the directory cache 396 over others, a method, in accordance with one embodiment of the present invention, for identifying entries that may be more desirable to retain than others is illustrated in FIG. 6.

Figure 6:
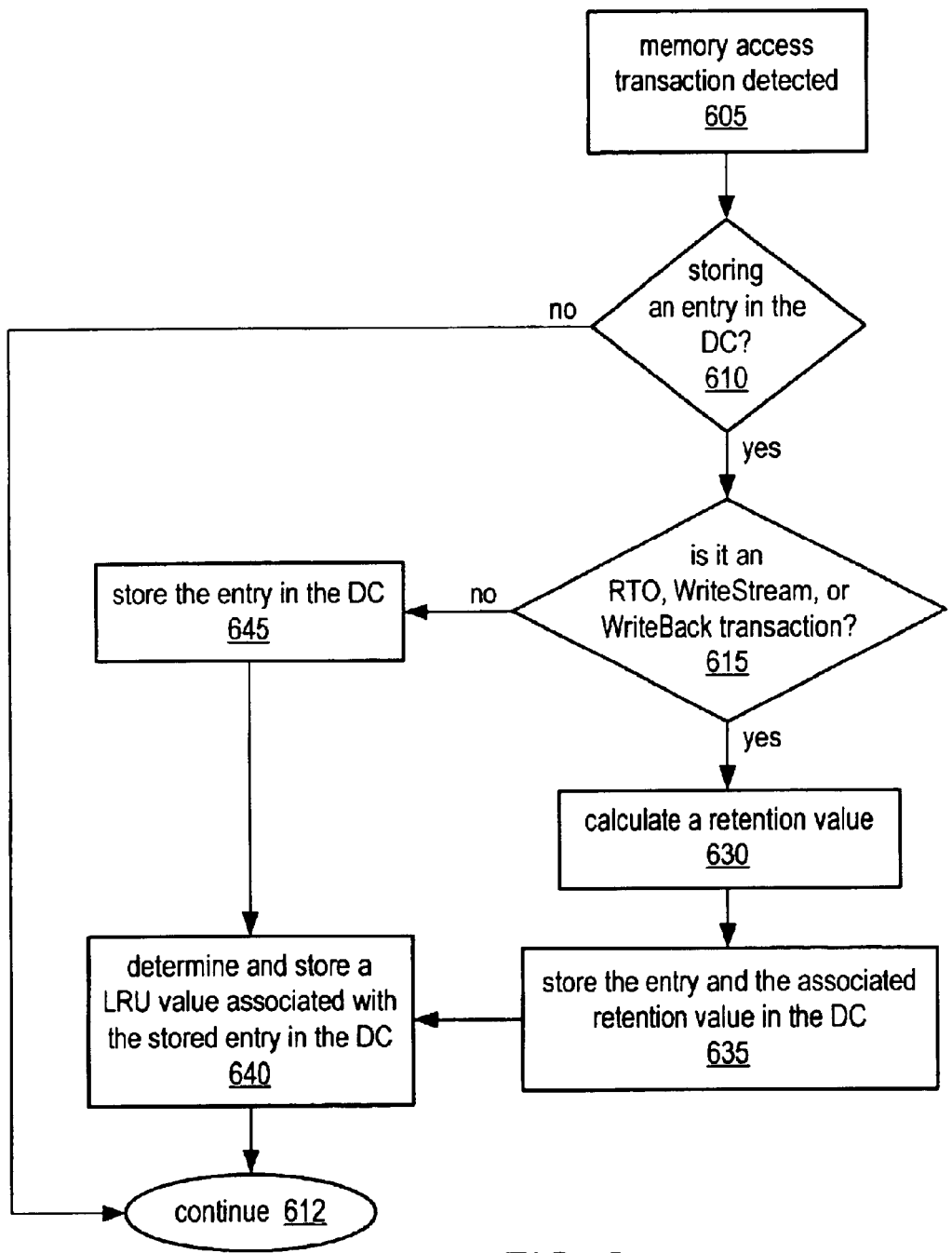
FIG. 6 illustrates a flow diagram of a method for identifying one or more directory cache entries that may be useful to retain in a directory cache of the system of FIG. 1, in accordance with one embodiment of the present invention.

In the method of FIG. 6, the coherency module 382, in one embodiment, detects (at 605) a memory access transaction. As mentioned above, the memory access transaction may include, but is not limited to, RTO, RTS, WriteStream, WriteBack, and ReadStream. The coherency module 382, in one embodiment, determines (at 610) if an entry is to be stored (or updated) in the directory cache 396. An entry may be stored in the directory cache 396, for example, in response to a receipt of a memory access transaction (e.g., RTO, RTS) that may have been initiated by the requesting board 510 (see FIG. 5). However, in one embodiment, not all of the memory access transactions may cause an entry to be created in the directory cache 396. If it is determined (at 610) that no entry is to be stored in the directory cache 396, then the method of FIG. 6 continues (at 612) with its normal operation.

If, however, it is determined (at 610) that it is desirable to store an entry in the directory cache 396, then the coherency module 382 determines (at 615) if the transaction detected (at 605) is a RTO, WriteStream, or WriteBack transaction. If the transaction is one of the three aforementioned transactions, then, in one embodiment, the coherency module 382 calculates (at 630) a retention value for the entry that is to be stored in the directory cache 396. The retention value, in one embodiment, is indicative of whether it is desirable to victimize one entry over another when the corresponding set 410 in the directory cache 396 is full, for example. As explained earlier, the retention value of the entry stored in the directory cache 396 may, for example, be saved in the retention bit field 475 (see FIG. 4C).

The coherency module 382, in one embodiment, stores (at 635) the entry and its associated retention value in the directory cache 396. In one embodiment, a LRU value that is associated with the entry stored (at 635) in the directory cache 396 is determined and stored (at 640). Subsequently, in one embodiment, the method of FIG. 6 continues (at 612) with normal operation.

If it is determined (at 615) that the memory access transaction is not at least one of a RTO, WriteStream, and WriteBack transaction, then the coherency module 382, in one embodiment, stores (at 645) the entry in the directory cache 396. Thus, although not so limited, in the illustrated embodiment, a retention value is not calculated for a RTS transaction, for example. The coherency module 382, in one embodiment, determines and stores (at 640) an LRU value for the entry stored (at 645) and stores it in the directory cache 396. Subsequently, in one embodiment, the method of FIG. 6 continues (at 612) with normal operation.

Figure 7:
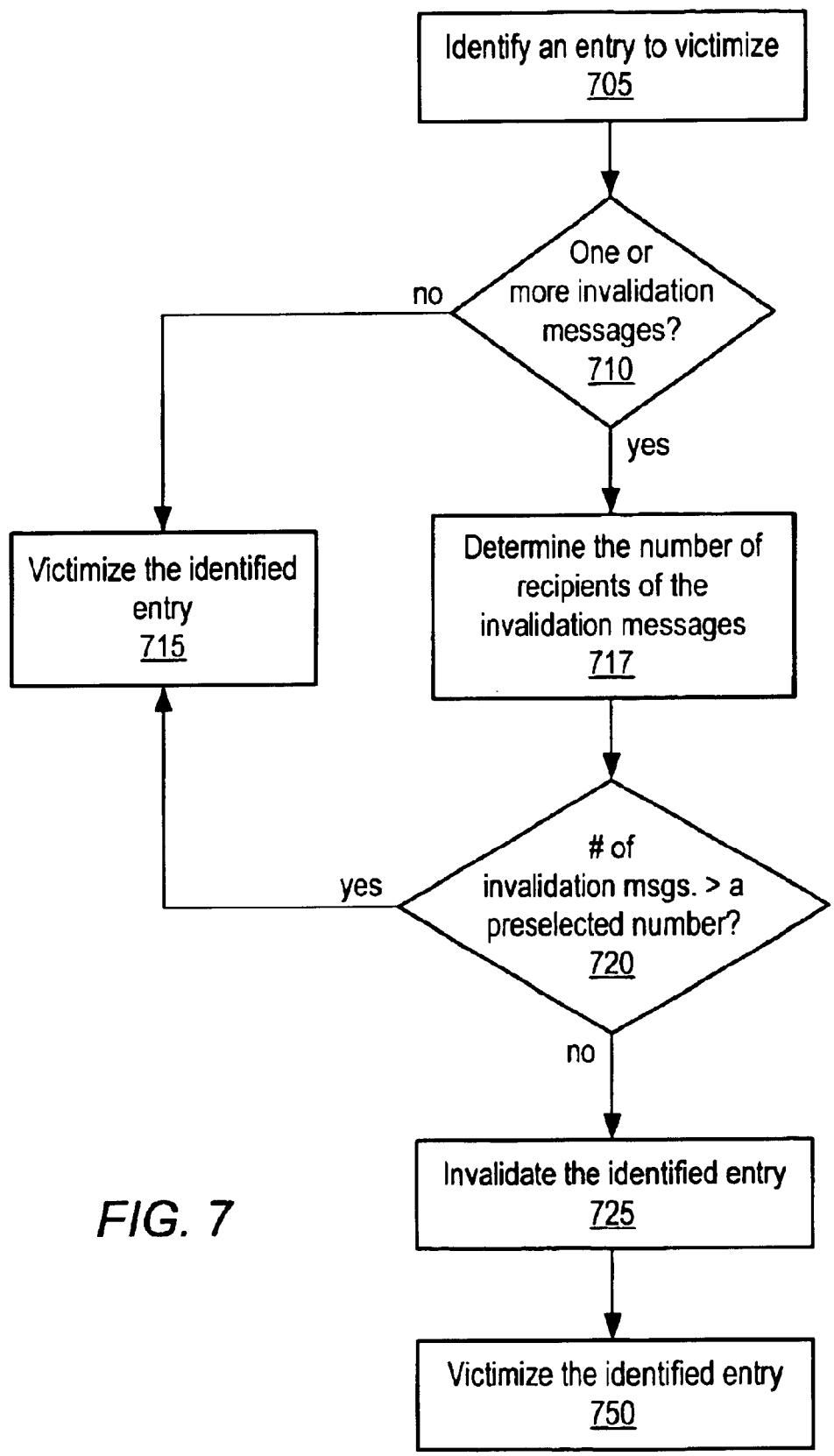
FIG. 7 depicts a flow diagram of a method for invalidating a victimized entry from the directory cache of the system of FIG. 1, in accordance with one embodiment of the present invention.

Referring now to FIG. 7, one embodiment of a method of invalidating a victimized entry from a particular set 410 of the directory cache 396 is illustrated. The term "victimized" may cover an entry or entries that have been removed or selected for removal (but not necessarily yet removed) from the directory cache 396. For illustrative purposes, it is herein assumed that the home board 520 (see FIG. 5) of a particular domain has received a transaction for which it is desirable to store a new entry in one of the sets 410 of the directory cache 396, and that it is desirable to victimize an existing entry to make room for the new entry. The home board 520 identifies (at 705) an entry to victimize from the directory cache 396. The manner of selecting an entry to victimize may vary from one implementation to another. For example, in one embodiment, the retention bit associated with stored entries may be considered when selecting an entry to victimize.

The home board 520 determines (at 710) whether one or more invalidation messages may need to be transmitted to one or more expander boards 40 based on the identified (at 705) entry (i.e., the entry to be victimized). It may be desirable to broadcast one or more invalidation messages, for example, when the identified (at 705) entry for victimization is a shared entry. This is because if a shared entry is victimized in the home board 520, the home board 520 may no longer be able to determine at a later time which caches 362(1–4) (see FIG. 3) in the domain are sharing that line. To avoid such a situation, before (or contemporaneously with or after) victimizing a shared entry from the directory cache 396, the home board 520 may transmit invalidation messages to invalidate the cache line associated with that shared entry. An invalidation message, in one embodiment, invalidates the cache line corresponding to the identified (at 705) entry (or victimized entry) in all of the caches 362(1–4) (see FIG. 3) that share that cache line.

If the coherency module 382 determines (at 710) that one or more invalidation messages may not need to be transmitted, then the coherency module 382 victimizes (at 715) the identified (at 705) entry. If, however, the coherency module 382 determines (at 710) that one or more invalidation messages may need to be transmitted (at 710), then the coherency module 382 determines (at 717) the number of recipients of the invalidation messages in the domain.

In one embodiment, the number of recipients of the invalidations may depend on the number of caches 362(1–4) that are sharing the cache line corresponding to the identified (at 705) entry in the directory cache 396. If (at 720) the number of recipients of the invalidation messages exceed a preselected number, then the identified (at 705) entry is victimized (at 715). This is because a wide-spread use of the cache line corresponding to the identified (at 705) entry may imply that the potential cost of re-fetching the cache line for each sharer (or recipient) may outweigh the future cost of broadcasting an invalidate message. As such, when the number of sharers of the cache line exceed the preselected number, it may not be desirable to perform victim invalidation (described below).

If (at 720) the number of invalidation messages that may need to be transmitted does not exceed the preselected number, then the home board 520 invalidates (at 725) the identified (at 705) entry. In one embodiment, invalidating (at 725) the identified (at 705) entry comprises changing the status of the cache line associated with the identified (at 705) entry to gM in the home board 520. One embodiment of the invalidating (at 725) the identified (at 705) entry is described below in more detail in FIG. 8. After invalidating (at 725) the entry that is identified for victimization, the home board 520 victimizes or removes (at 750) that entry from the directory cache 396.

Figure 8:
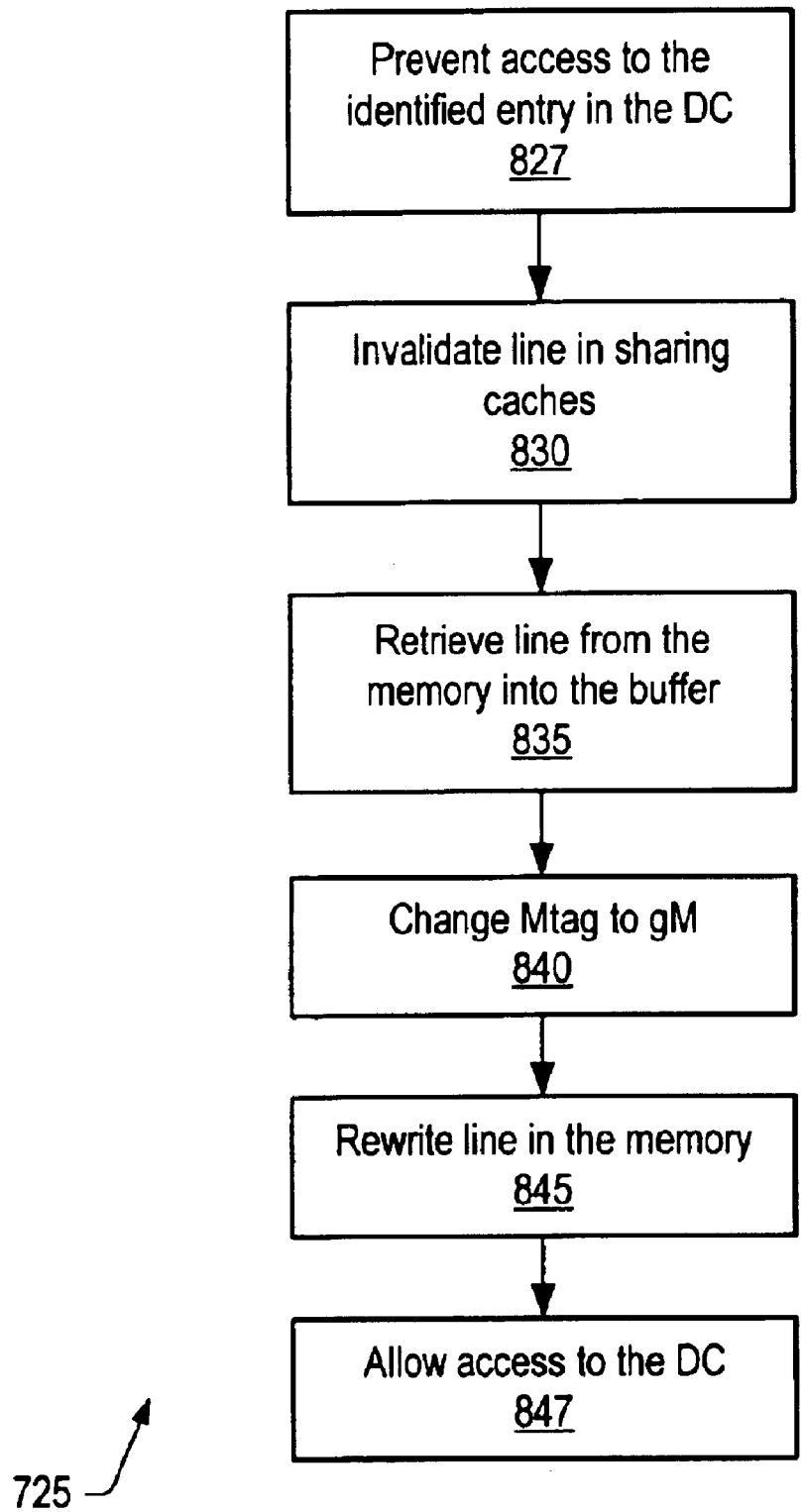
FIG. 8 illustrates a flow diagram of an alternative method of FIG. 7, in accordance with one embodiment of the present invention.

In the illustrated embodiment of FIG. 8, in the process of invalidating the identified (at 705) entry, the home board 520 may prevent (at 827) access, via the locking module 398 (see FIG. 3), to the identified (at 705) entry in the directory cache 396, if the access to the identified (at 705) entry was not blocked as part of the cache miss. The home board 520 invalidates (at 830) the cache line corresponding to the identified (at 705) entry from all of the caches 362(1–4) sharing that line in the domain. In one embodiment, the home board 520 may use the contents of the mask field 445 (see FIG. 4) of the shared entry 435 (see FIG. 4) to identify which caches 362(1–4) are sharing the cache line.

The home board 520 retrieves (at 835) the line from the local memory 361(1–4) into the buffer 384 (see FIG. 3) of the SDI 383. The home board 520 changes (at 840) the Mtag of the line retrieved (at 835) to gM. After changing (at 840) the status of the line retrieved (at 835), the home board 520 rewrites (at 845) the line back to the local memory 361(1–4). The home board 520 allows (at 847) access to the directory cache 396 once the identified (at 705) entry is invalidated.

In one embodiment, the home board 520 may not perform victim invalidation (at 725) every $n^{th}$ time, where n may be a programmable variable. This may be done to reduce or prevent thrashing. That is, if the system 10 is thrashing, it is likely that at some point in time, the thrashing line may fall on the $n^{th}$ victimization, and, as such, the thrashing line will not be invalidated, thereby reducing or preventing thrashing, in one embodiment.

For ease of illustration, several references to "cache line(s)" or "line(s)" are made in the discussion herein with respect to memory access. It should be appreciated that these references, as utilized in this discussion, may refer to any line that is cacheable, and include one or more bits of information that is retrieved from the caches 362(1–4) and/or memories 361(1–4) (see FIG. 3) in the system 10.

The various system layers, routines, or modules may be executable control units (such as control unit 389 (see FIG. 3). Each control unit 389 may include a microprocessor, a microcontroller, a digital signal processor, a processor card (including one or more microprocessors or controllers), or other control or computing devices.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    identifying an entry to remove from a directory cache;
    determining whether it is desirable to transmit an invalidation message to one or more caches in a system based on the identified entry by determining if a number of devices sharing the cacheable line is less than a preselected amount; and
    changing the status of a cacheable line in response to determining that it is desirable to transmit the invalidation message.

2. The method of claim 1, wherein determining whether it is desirable to transmit the invalidation message comprises determining whether thrashing may be reduced.

3. The method of claim 1, wherein changing the status of the cacheable line comprises changing the status of the cacheable line to indicate it is unshared.

4. The method of claim 3, wherein changing the status further comprises preventing access to the identified entry in the directory cache.

5. The method of claim 4, wherein changing the status comprises reading the cacheable line from a memory into a buffer and changing the status of the line to an unshared status.

6. The method of claim 5, wherein changing the status comprises transferring the cacheable line from the buffer to the memory.

7. The method of claim 6, wherein changing the status comprises allowing access to the identified entry in the directory cache in response to transferring the cacheable line from the buffer to the memory.

8. An apparatus, comprising:
    a directory cache adapted to store one or more cache entries; and
    a control unit adapted to:
        determine whether it is desirable to remove a shared cache entry from the directory cache;
        invalidate the shared cache entry in response to determining that it is desirable to remove the shared cache entry from the directory cache; and
        invalidate the shared cache entry based on a number of devices sharing a cacheable line corresponding to the shared entry.

9. The apparatus of claim 8, wherein the directory cache is a multi-way associative directory cache.

10. The apparatus of claim 8, further comprising a buffer, wherein the control unit transfers the cacheable line from a memory to the buffer.

11. The apparatus of claim 10, wherein the control unit changes the status of the cacheable line stored in the buffer.

12. The apparatus of claim 11, wherein the control unit transfers the cacheable line from the buffer to the memory.

13. The apparatus of claim 8, wherein the control unit does not invalidate the shared entry every $n^{th}$ time to reduce thrashing, where n may be any programmable value.

14. An article comprising one or more machine-readable storage media containing instructions that when executed enable a processor to:
    determine that at least one set of a directory cache is full;
    identify an entry to remove from the directory cache;
    determine if the identified entry is a shared entry; and
    change the status of a cacheable line in response to determining that the identified entry is a shared entry.

15. The article of claim 14, wherein the instructions when executed enable the processor to change the status of the cacheable line in a memory that has the cacheable line stored therein.

16. The article of claim 14, wherein the instructions when executed enable the processor to receive a request to store a new entry in the directory cache.

17. The article of claim 14, wherein the instructions when executed enable the processor to prevent access to the identified entry in the directory cache at least until the status of the cacheable line is changed.

18. The article of claim 17, wherein the instructions when executed enable the processor to retrieve the cacheable line from a memory into a buffer to change the status of the cacheable line in the memory.

19. The article of claim 18, wherein the instructions when executed enable the processor to transfer the cacheable line from the buffer to the memory in response to changing the status of the cacheable line.

20. An article comprising one or more machine-readable storage media containing instructions that when executed enable a processor to:

identify an entry to remove from a directory cache;

determine if the identified entry is a shared entry; and change the status of a cacheable line in response to determining that the identified entry is a shared entry based on a number of devices sharing the cacheable line.

* * * * *